(12) United States Patent
Stamey, Jr. et al.

(10) Patent No.: US 6,994,787 B1
(45) Date of Patent: Feb. 7, 2006

(54) CLEAR PLASTIC INJECTION MOLDED FUEL/WATER SEPARATOR

(75) Inventors: Willie Luther Stamey, Jr., Kings Mountain, NC (US); Mark Allen Roll, Bessemer City, NC (US)

(73) Assignee: Wix Filtration Corp., Gastonia, NC (US)

( * ) Notice: Subject to any disclaimer, the term of this patent is extended or adjusted under 35 U.S.C. 154(b) by 188 days.

(21) Appl. No.: 10/157,932

(22) Filed: May 31, 2002

(51) Int. Cl.
*B01D 27/08* (2006.01)
*B01D 35/30* (2006.01)

(52) U.S. Cl. .................. 210/232; 210/94; 210/248; 210/440

(58) Field of Classification Search .................. 210/94, 210/232, DIG. 17, 248, 440
See application file for complete search history.

(56) References Cited

U.S. PATENT DOCUMENTS

| | | | |
|---|---|---|---|
| 4,522,712 A | 6/1985 | Fischer et al. | |
| 4,668,393 A | 5/1987 | Stone | |
| 4,992,166 A | * 2/1991 | Lowsky et al. | |
| 5,171,430 A | 12/1992 | Beach et al. | |
| 5,259,953 A | * 11/1993 | Baracchi et al. | |
| 5,556,542 A | * 9/1996 | Berman et al. | |
| 5,772,881 A | * 6/1998 | Stockhowe et al. | |
| 5,817,234 A | 10/1998 | Dye et al. | |
| 5,993,675 A | 11/1999 | Hagerthy | |
| 5,997,739 A | 12/1999 | Clausen et al. | |
| 6,012,485 A | 1/2000 | Connelly et al. | |
| 6,083,381 A | 7/2000 | Connelly et al. | |
| 6,085,915 A | * 7/2000 | Schwandt et al. | |
| 6,224,439 B1 | 5/2001 | Sato et al. | |

FOREIGN PATENT DOCUMENTS

| | | | |
|---|---|---|---|
| GB | 878851 | * | 10/1961 |
| GB | 2220866 | * | 1/1990 |
| JP | 2000-345936 A | * | 12/2000 |

* cited by examiner

*Primary Examiner*—Thomas M. Lithgow
(74) *Attorney, Agent, or Firm*—Berenato, White & Stavish

(57) ABSTRACT

A fuel/water separator threadingly engaging a base at a first open end and a drain valve at a second open end. The fuel/water separator is constructed of a translucent plastic material enabling a viewer to evaluate the presence of contaminants without having to loosen the filter or open a drain valve.

8 Claims, 2 Drawing Sheets

CLEAR PLASTIC INJECTION MOLDED FUEL/WATER SEPARATOR

BACKGROUND OF THE INVENTION

1. Field of the Invention

The present invention relates to fuel/water separators. More particularly, the present invention relates to separator constructed primarily from a clear material having a spin on drain valve and a spin on base plate.

2. Description of Related Art

There are numerous sources of water contamination in hydrocarbon liquid fuels. Trace amounts of water exist in fuel due to the refining and purification processes performed at the petroleum refineries. Next, water may seep into gasoline storage tanks or may form as condensation in storage tanks or delivery trucks. Additionally, when gasoline or other liquid fuels are placed in the fuel tanks of vehicles or boats, water may form through condensation, or may be inadvertently introduced into the tank, particularly in marine environments. As a result, virtually all liquid fuel used to power automotive, diesel or marine engines contain a fractional amount of water when it is introduced into the engine for combustion.

In order to prevent water from entering the engine, the fuel supply system generally has a fuel filter therein to separate water from fuel in addition to removing foreign substances. Most of the fuel filters employ a can into which fuel containing water is induced. Typically, water has the specific gravity greater than that of the fuel. Because of the differences in the respective specific gravity between the water and the fuel, the water is separated from the fuel and accumulates under the fuel layer, i.e., at the bottom of the can.

Many applications utilize a fuel/water separator filter to prevent water from entering the engine in the fuel. The filter separates not only the water but also traps any particulate matter in the fuel as well. Such examples include numerous liquid and pneumatic applications throughout vehicular, industrial and agricultural industries.

Currently, fuel/water separators are manufactured from metals in the shape of a can. The use of metals as the material prevents the operator or service person from being able to evaluate the presence of water or other contaminant within the separator's body.

On the application, the separator is mounted with the dome end down. On the fuel/water separator, a drain can be added to the dome of the filter. The metal can is fitted with a drain nut assembly. The assembly is press fit into or crimped into place in the metal can and a multi-piece standard drain valve or a multi-piece self-venting valve is inserted in the dome end. The operator or service person must open the valve and allow the water or contaminant to drain until raw fuel flows from the drain. This requires that the fuel become exposed to an external environment. Such a condition may be dangerous to the operator or service person.

The typical fuel/water separator assembly has a housing which contains a filter element used for filtering the fluid as it circulates through the housing. Ordinarily, the housing has an end adapted for pairing the filter assembly to a base member from which the fluid will flow by means of an internally threaded fluid exit port that threads onto a corresponding externally threaded configuration on the base. The housing also has another end which is ordinarily closed. The fluid exit port is ordinarily centrally located in the housing cover which is permanently, peripherally attached to the first end of the housing. Contaminated fluid flows into the filter housing through fluid inlet holes located in the cover and surrounding the fluid exit port, and clean, filtered fluid flows out of the filter housing through fluid exit port. The filter housing is sealed against the base member by using an elastomeric gasket which surrounds the inlet holes and the exit port.

It is known to have a fuel filter assembly suitable for detecting water levels having a vessel or can preferably made from a transparent synthetic resin so that the water level is visible. However, it is not known to have the assembly that is threaded at both ends.

In yet another embodiment, it is also known to use a clear window allowing an operator to visually inspect the fluid and particulates within the can body. Here again, the can body is not threaded on both ends.

The prior art fails to provide an adequate single-piece can or vessel that is capable of having additional components attached via threads at both ends of the can or vessel. For instance, the prior art fails to permit either a standard drain valve or a self-venting drain valve to be screwed into a threaded portion in the dome. The prior art also fails to provide a base plate that threads into the can or vessel in order to permit the entire device to be installed for operations, whether used for oil, water, hydraulic, etc.

In view of the above-mentioned drawbacks, there is a need for low cost, one-piece clear injected molded can. The can further needs to be compatible with a dome having the ability to receive a drain (whether standard or self-venting) and a base to thread the entire assembly to the desired application.

SUMMARY OF THE INVENTION

The present invention is directed to a fuel/water separator assembly that separates water and particulate matter from the fuel during operation of the intended device. The fuel/water separator is designed such that the can body is generally clear or transparent permitting an operator or service person to visually determine the state of contamination.

The assembly further includes a can body with a dome end that is integrally formed and threaded to receive a drain valve. The drain valve can be either standard in the industry or self-draining.

The assembly has an open end opposite the dome. The open end is externally threaded to mate with an internally threaded base. In another embodiment, the open end is internally threaded to mate with an externally threaded base.

The present invention also provides a fuel/water separator assembly made from a one-piece, injection molded filter body having a first open end defining a dome and a second open end for receiving a base plate. A molded threaded portion is integrally formed with the first open end for threadingly receiving a drain valve. A male threaded portion integrally forms the second open end for threadingly engaging a base plate. The entire filter body is translucent to permit viewing of the internal components of the separator assembly.

These and other benefits will be apparent with reference to the following detailed description and associated drawings which exemplify the underlying principles of the instant invention.

DETAILED DESCRIPTION OF THE PRESENT INVENTION

Figure 1:
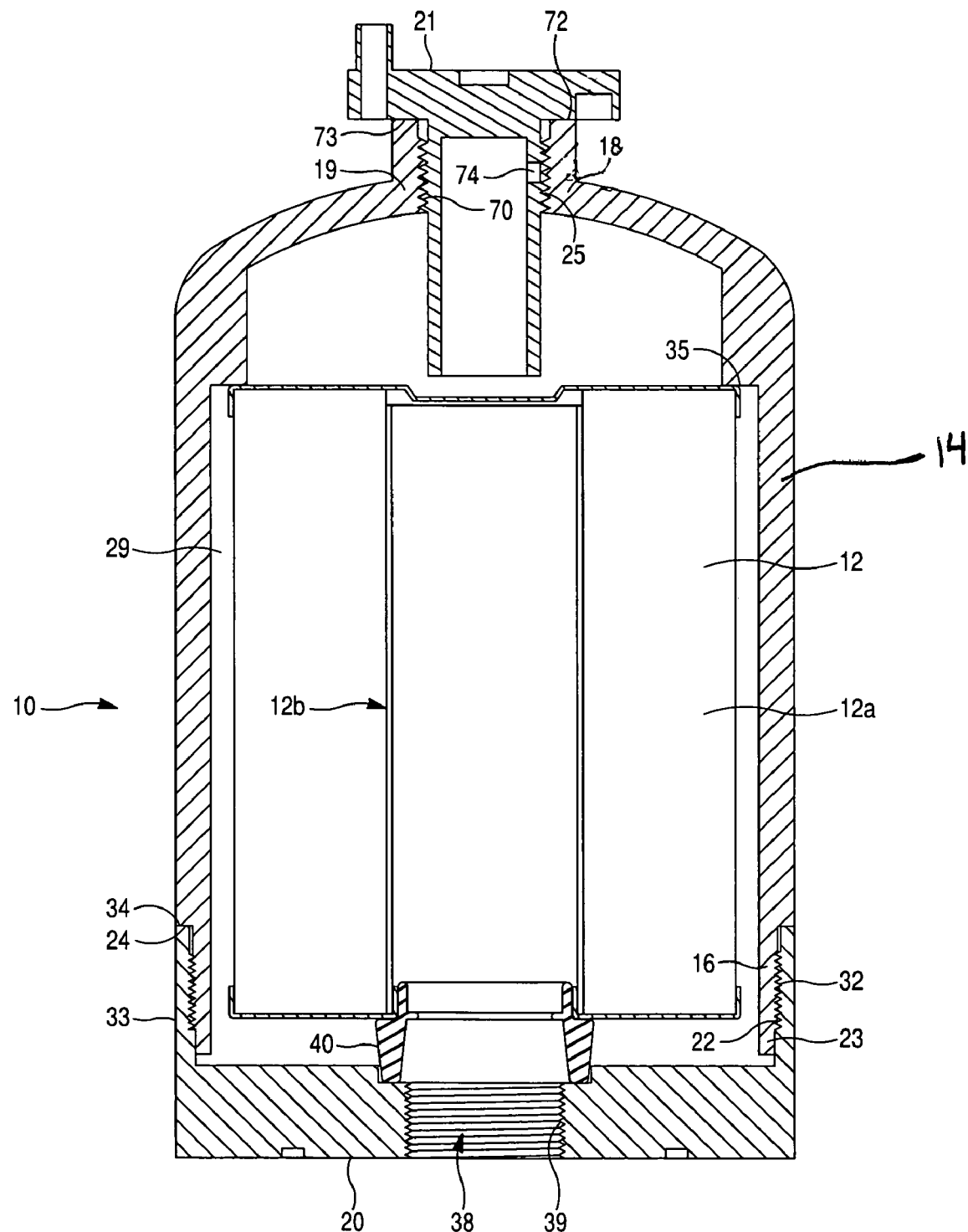
FIG. 1 is a side elevation of the present invention.

Referring now to FIG. 1, there is shown a filter element assembly 10 configured in accordance with the principles of the present invention which has therein an annular filter element 12. The assembly 10 is used for containing filter elements 12 used to separate various fluids from one another based on their physical properties. However, the present invention is not limited to separate fluid, in fact this arrangement can also be used with other applications.

There is shown a housing 14 of the assembly 10 which has a first end 16 which is externally threaded to receive a base 20 and a second end 18 which is internally threaded to receive a drain 21. The housing 14 has external threads 22 at its first end 16 which start inboard of an unthreaded portion 23 which extends back from a flat annular first end edge 24 of the housing 14. The second end 18 of the housing 14 has internal threads 25. The tubular housing 14 is preferably about ⅛ of an inch in thickness and defines a cylindrical space 29 which receives the annular filter element 12, shown in FIG. 1. The thickness of the housing 14 may vary depending on the specific design requirements, e.g., systems with higher pressures may require a thicker housing 14, different materials used to construct the housing 14 will have varying properties.

The second end 18 has an annular projection 19 that is smaller in diameter than that of the housing 14. The projection 19 has an outer edge 73. The projection 19 has internal threads 25 that mate with threads 70 on drain 21.

Located proximate the second end 18 within the cylindrical space are axial ribs 35. The axial ribs 35 properly position the annular filter 12 within the housing 14 and allow water being separated to flow into a collecting chamber proximate the drain valve 21. Once the base 20 is threaded onto the filter, the filter is held in place by axial ribs 35 and the rubber grommet 40 (discussed herein).

Figure 2:
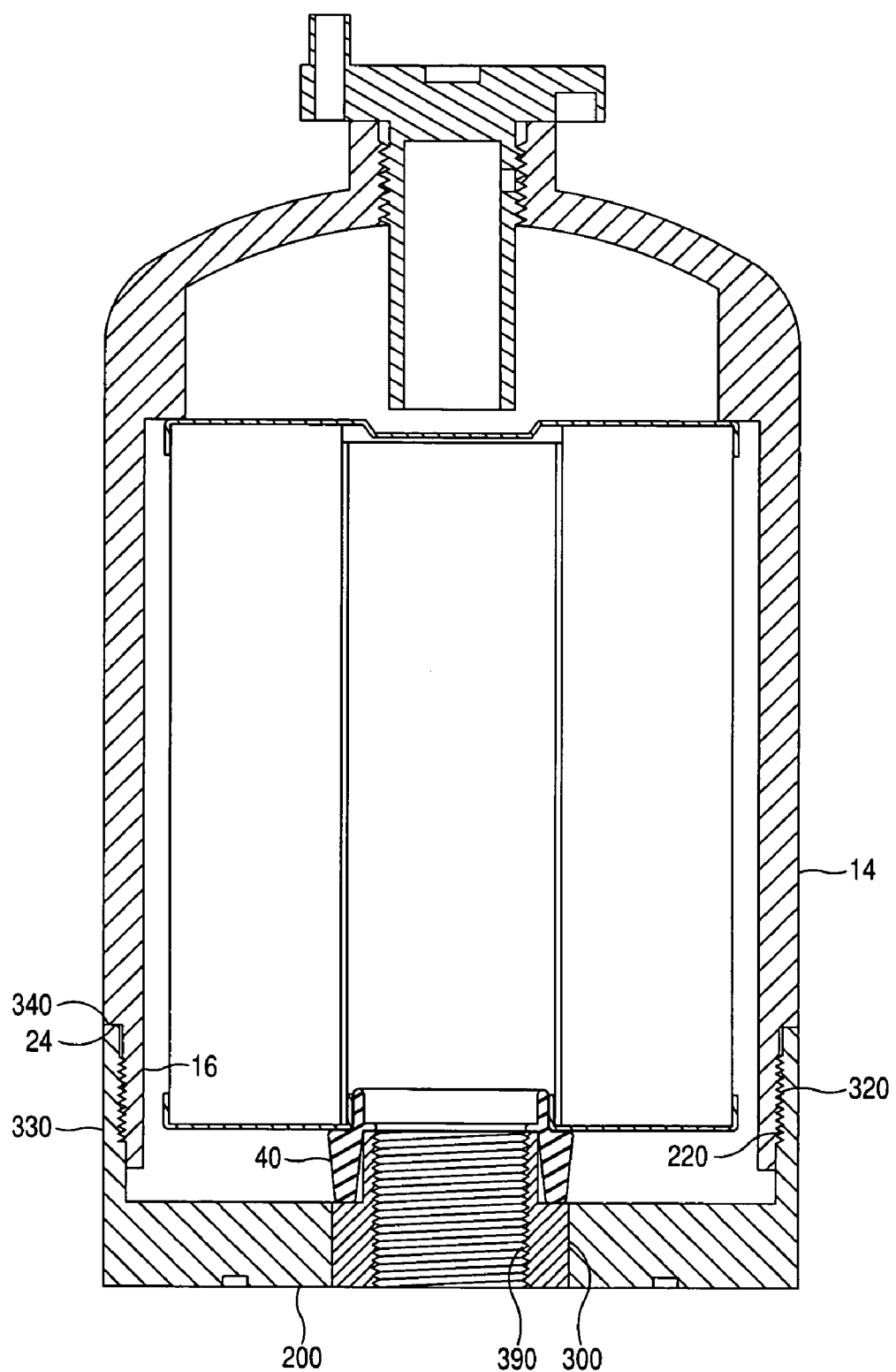
FIG. 2 is a side elevation of the alternate embodiment of the present invention.

The drain 21 has external peripheral threads 70 that engage the internal threads 25 at the second end 18 and the annular projection 19 of the housing 14 to hold the drain 21 within the dome shaped second end 18 of the housing, see FIGS. 1 and 2. The drain 21 also has an axially facing shoulder 72 toward the external peripheral threads 70 which engages the outer surface of the annular projection 19. The shoulder 72 has a chamfer at the leading edge so as accept an o-ring (not shown). This permits the drain 21 to be threadingly secured to the housing 14 without allowing any fluid to leak therefrom. The drain 21 has a drain hole 74 through which filtered liquids may be removed from the housing 14.

The drain 21 is screwed into the molded dome end 18 of the housing 14. This allows the drain 21 to be screwed tightly against the housing 14 or loosened for draining of contaminants.

The base 20 has annular threads 32 which threadingly engage with the annular threads 22 of the housing 14 and has an outer flange portion 33 that includes an annular shoulder 34. The shoulder 34 engages the first end edge 24 of the housing 14 when the base 20 is threaded into the first threaded end portion 16. Since the shoulder 34 abuts the end edge 24 of the housing 14, a very tight friction fit is obtained between the base 20 and the housing 14. In addition, thread lock is applied to insure a seal is made.

The base 20 has a central opening 38 which has threads 39 that allow the base 20 to mount the filter housing 14 to a spin-on fuel separator. The central opening 38 can be either an inlet for the fluid to be separated or an outlet for fluid depending on the interface with the machine which is utilizing the fluid. The diameter of the central opening 38 may vary depending upon the size of the mounting stem (not shown).

The filter element 12 is inserted in to the cylindrical space 29 of the housing 14. The base 20 is then threaded onto the housing. A rubber grommet 40 is positioned between the annular filter 12 and the base 20.

The base 20 itself is manufactured from material capable of withstanding the stresses involved with the system. Some of those materials include but are not limited to: aluminum, steel, and brass.

Referring now to FIG. 2, an alternate embodiment of the base is shown. Here, the base 200 is constructed from plastics. The base has annular threads 320 which threadingly engage with the annular threads 220 of the housing 14 and has an outer flange portion 330 that includes an annular shoulder 340. The shoulder 340 engages the first end edge 24 of the housing 14 when the base 200 is threaded into the first threaded end portion 16. Since the shoulder 340 abuts the end edge 24 of the housing 14, a very tight friction fit is obtained between the base 200 and the housing 14.

The base 200 is formed from a plastic material similar to that of the housing 14 and has a ring 300 integrally formed therein during molding. The preferred material with which the ring is made from is brass, however those skilled in the art would recognize that other materials may also be used. The ring 300 has a central opening 380 which has threads 390 that allow the ring 300 to mount the filter housing 14 to a spin-on fuel separator. The central opening 380 can be either an inlet for the fluid to be separated or an outlet for fluid depending on the interface with the machine which is utilizing the fluid. The diameter of the central opening 380 may vary depending upon the size of the mounting stem (not shown).

Here again, before the base 200 is threaded onto the housing 14 with an annular filter element 12 therein, a rubber grommet 40 used to properly position the filter element 12 and create a tight secure fit within the filter assembly 10.

In order to prevent fluid leakage during filtration, a sealant layer (not shown) is placed between the internal threads 220 of the housing 14 and the external threads 320 of the base 220. In the preferred embodiment, the sealant is made of a single component anaerobic material and forms a permanent bond so that the housing 14 is incapable of opening. A two-part epoxy of other similar material may also be used.

As an example, the preferred embodiment of the filter housing 14 is constructed of a polymer or plastic housing that is capable of permitting an operator to view the contents within the housing 14. The filter assembly 10 is manufactured through injection molding. The filter assembly may also be tinted a particular color to match one of the fluids to pass through the filter. The tinting would be matched to that of a fuel allowing an operator/user to distinguish contaminants that need to be removed from that of the fuel. A mark or indication line (not shown) may also be inserted on the housing 14 to indicate preferred levels at which time contaminants need to be drained.

Similarly, the base 200 of the second embodiment shown in FIG. 2 may be constructed of a similar material of the housing 14, This would further increase an operator/user's ability to distinguish contaminants within the filter assembly 10.

From the foregoing description, one skilled in the art can easily ascertain the essential characteristics of this invention, and without departing form the spirit and scope thereof, can make various changes and modifications of the invention to adapt it to various usages and conditions. For example, the tubular housing and the drain can be formed as a single unitary member. Similarly, an embodiment wherein the brass ring is threadingly engageable with the base rather than integrally formed. The ring may also be constructed of a plastic capable of withstanding the stresses involved with intended operations.

We claim:

1. A fluid separator assembly comprising:
    a one-piece, injection-molded filter body housing an annular filter element entirely therewithin and having a first open end receiving a base plate and a second open end defining a dome;
    a first molded threaded portion integrally formed with said first open end threadingly receiving said base plate;
    a second molded threaded portion integrally formed with said second open end threadingly receiving a self-venting drain valve; and
    wherein said filter body is translucent to permit viewing of internal components of said separator assembly.

2. The fluid separator assembly according to claim 1, wherein said first molded threaded portion is externally threaded for engaging said base plate having internal threads.

3. The fluid separator assembly according to claim 1, wherein said base plate is formed of a material selected from the group consisting of steel, aluminum, and brass.

4. The fluid separator assembly according to claim 1, wherein said base plate is manufactured from a plastic and further comprises a ring integrally formed during manufacturing.

5. The fluid separator assembly according to claim 4, wherein said ring is formed of a material selected from the group consisting of steel, aluminum, and brass.

6. The fluid separator assembly according to claim 1, wherein said filter body is formed from a plastic material.

7. The fluid separator assembly according to claim 6, wherein said filter body is tinted to match a color of one of a plurality of fluids within said separator assembly.

8. The fluid separator assembly according to claim 1, wherein an indication line is located on said filter body.

* * * * *